US012670168B2

(12) United States Patent
Gerlag

(10) Patent No.: US 12,670,168 B2
(45) Date of Patent: Jun. 30, 2026

(54) SYSTEM AND METHOD FOR PROCESSING CONTINUOUS QUERIES WITH AGGREGATING FUNCTIONS USING ACCUMULATORS

(71) Applicant: Microsoft Technology Licensing, LLC, Redmond, WA (US)

(72) Inventor: Daniel Donald Gerlag, Chilliwack (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/891,599

(22) Filed: Sep. 20, 2024

(65) Prior Publication Data

US 2026/0087018 A1      Mar. 26, 2026

(51) Int. Cl.
*G06F 16/2455* (2019.01)
*G06F 16/23* (2019.01)
(52) U.S. Cl.
CPC .... *G06F 16/24568* (2019.01); *G06F 16/2358* (2019.01); *G06F 16/24557* (2019.01)
(58) Field of Classification Search
CPC ........... G06F 16/24568; G06F 16/2358; G06F 16/24557
See application file for complete search history.

(56) References Cited

U.S. PATENT DOCUMENTS

| | | | |
|---|---|---|---|
| 8,521,867 B2 * | 8/2013 | Srinivasan | G06F 16/244 709/224 |
| 10,042,890 B2 * | 8/2018 | Hsiao | G06F 16/24535 |
| 10,956,422 B2 * | 3/2021 | de Castro Alves | G06F 16/24568 |
| 2009/0106198 A1 * | 4/2009 | Srinivasan | G06F 16/24556 |
| 2015/0161214 A1 * | 6/2015 | Kali | G06F 16/24558 707/758 |
| 2018/0329958 A1 * | 11/2018 | Choudhury | G06F 16/2456 |

FOREIGN PATENT DOCUMENTS

CN          102456069 A      5/2012

OTHER PUBLICATIONS

"Redis sets", accessed on link https://redis.io/docs/latest/develop/data-types/sets/, retrieved on Jul. 1, 2024, 6 pages.
"Redis sorted sets", accessed on link https://redis.io/docs/latest/develop/data-types/sorted-sets/, retrieved on link Jul. 1, 2024,.
Dong, Siying., "Prefix Seek", accessed on link https://github.com/facebook/rocksdb/wiki/Prefix-Seek, Aug. 4, 2021, 12 pages.
International Search Report and Written Opinion received for PCT Application No. PCT/US2024/030145, mailed on Nov. 6, 2025, 13 pages.

* cited by examiner

*Primary Examiner* — Dangelino N Gortayo

(57)          ABSTRACT

A method, computer program product, and computing system for processing a continuous query including an aggregating function. An accumulator associated with the aggregating function is identified. A current aggregation result is generated for the aggregating function of the continuous query without accessing every entry of the accumulator. A continuous query result is generated for the continuous query using the accumulator associated with the aggregating function.

20 Claims, 3 Drawing Sheets

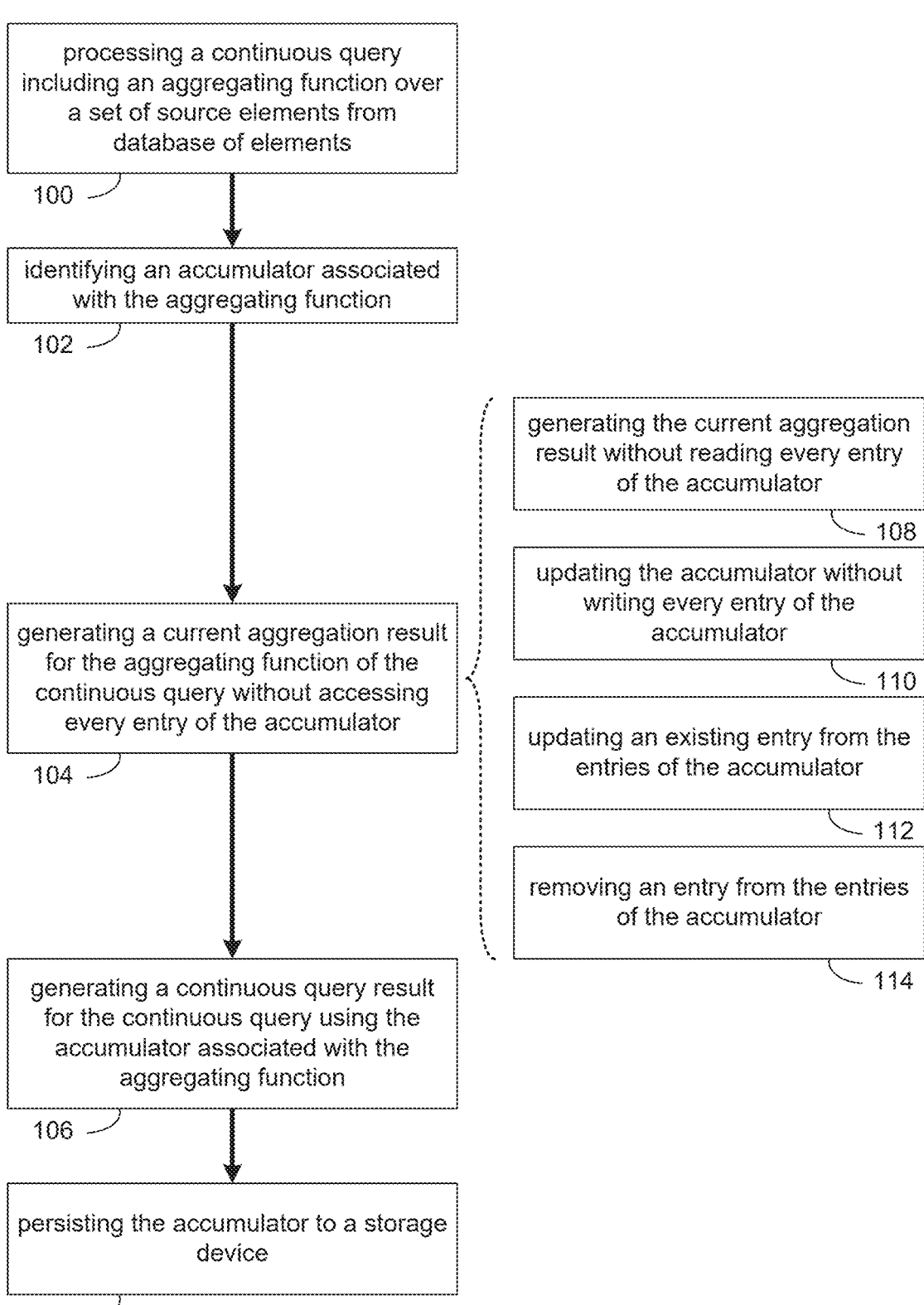

10 processing a continuous query including an aggregating function over a set of source elements from database of elements

100 identifying an accumulator associated with the aggregating function

102 generating a current aggregation result for the aggregating function of the continuous query without accessing every entry of the accumulator

104 generating the current aggregation result without reading every entry of the accumulator

108 updating the accumulator without writing every entry of the accumulator

110 updating an existing entry from the entries of the accumulator

112 removing an entry from the entries of the accumulator

114 generating a continuous query result for the continuous query using the accumulator associated with the aggregating function

106 persisting the accumulator to a storage device

SYSTEM AND METHOD FOR PROCESSING CONTINUOUS QUERIES WITH AGGREGATING FUNCTIONS USING ACCUMULATORS

BACKGROUND

When processing a query on data elements within a database or other data structure, the query may include a continuous or ongoing condition to be assessed in response to a change in the underlying data elements. However, conventional query management for continuous queries executed on a database are unable to process situations where data elements are altered in the database over time.

BRIEF DESCRIPTION OF THE DRAWINGS

FIG. 1 is a flow chart of one implementation of a continuous query management process;

Like reference symbols in the various drawings indicate like elements.

DETAILED DESCRIPTION

Figure 2:
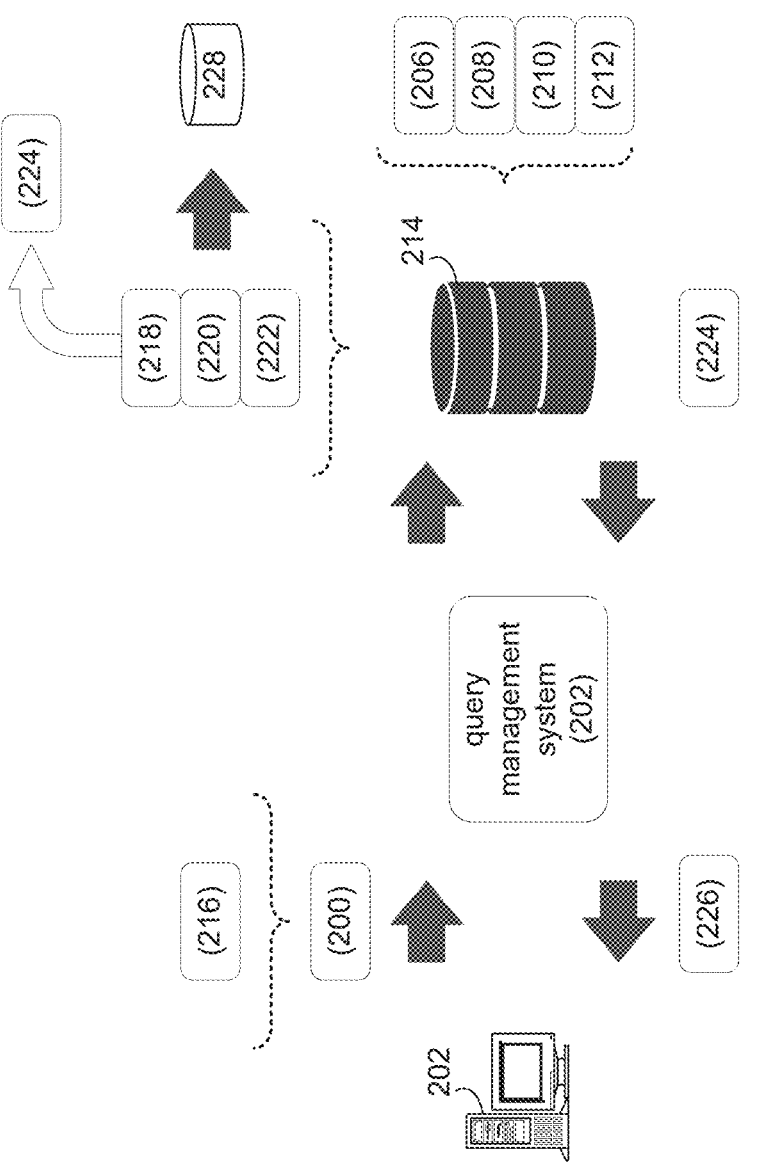
FIG. 2 is a diagrammatic view of the continuous query management process.

Implementations of the present disclosure provide dynamic access to accumulators for continuous queries that allow for the updating and removing of entries in the accumulator over time. For example, a database query is a request for data or information from a database. It is typically written in a query language. These queries usually support aggregations over sets of data, for example, the sum of all values or the max, or average. A continuous query is similar in concept to a regular database query but instead maps incoming events onto the query and invoke actions when an event changes the output of that query. Accordingly, the continuous query has a constantly changing result rather than a single point in time snapshot result of a normal query.

There are unique challenges for processing aggregations within the context of a continuous query that do not exist for regular queries. Regular query engines typically retrieve the data and apply each value to an accumulator. An accumulator is a data structure, specific to each aggregation type to produce the aggregation result. For example, the "max" aggregation is a single number, a query management system or query engine first sets this number to a first data point, and then for each additional data point, it will check which is higher and set the accumulator to the highest. At the end of this process, a "max" aggregation is defined.

The challenge with using this approach for continuous queries is that changes in data elements occur over time, and, sometimes, data elements leave the relevant set or the value of the data element changes. As such, entries of an accumulator need to be removed and/or updated, which traditional query management systems/query engines do not account for. For example, conventional query management systems do not know what the max value should be if the data element that is equal to the current max value is deleted as that information is lost. As will be described in greater detail below, the accumulators are persisted to disk while conventional query management systems/query engines do these in-memory which can result in access and/or performance issues (i.e., when performed in-memory, these accumulators are not stored and when persisted, the present disclosure limits the degree of access to avoid performing various input/output operations on the storage device).

As will be discussed in greater detail below, the continuous query management process processes a continuous query including an aggregating function (i.e., a type of function used in data analysis that processes multiple elements from a database and returns a summary value). An accumulator associated with the aggregating function is identified. A current aggregation result is generated for the aggregating function of the continuous query without accessing every entry of the accumulator (i.e., without reading and/or writing every entry of the accumulator). A continuous query result is generated for the continuous query using the accumulator associated with the aggregating function.

In this manner, the present disclosure provides an aggregation framework for processing continuous queries that supports the management and persistence of aggregation accumulators that can have previously added values removed or updated over time, all while minimizing disk access (which is a performance penalty).

The details of one or more implementations are set forth in the accompanying drawings and the description below. Other features and advantages will become apparent from the description, the drawings, and the claims.

The Continuous Query Management Process:

Referring to FIGS. 1-2, continuous query management process 10 processes 100 a continuous query including an aggregating function over a set of source elements from database of elements. An accumulator associated with the aggregating function is identified 102. A current aggregation result is generated 104 for the aggregating function of the continuous query without accessing every entry of the accumulator. A continuous query result is generated 106 for the continuous query using the accumulator associated with the aggregating function.

In some implementations, continuous query management process 10 processes 100 a continuous query including an aggregating function over a set of source elements from database of elements. A continuous query is a query (i.e., a request for information concerning a source element with conditional logic for evaluating various elements within the database of elements) that is issued once over a database of elements, and then logically runs continuously over the source element (i.e., target data of the continuous query) until the continuous query is terminated. In this manner, a continuous query allows a querying entity (i.e., a user) to obtain new or updated results concerning the source element without having to issue the same query repeatedly. In some implementations, a continuous query is generated by a computing device (e.g., in response to a user providing a text-based query with conditional logic to the computing device) and executed on the database of elements.

In some implementations, continuous query management process 10 processes 100 a continuous query including an aggregating function over a set of source elements from database of elements. An aggregating function is a type of function used in data analysis that processes multiple elements from a database and returns a summary value. Examples of aggregating functions include a sum, an average, a count, a maximum, a minimum, a median, etc. Referring also to FIG. 2, suppose a continuous query (e.g., continuous query 200) is processed 100 by a query management system (e.g., query management system 202) (after receiving continuous query 200 from computing device 204) for various source elements of a set of source elements (e.g., source element 206, 208, 210, 212) from a database of elements (e.g., database 214 of elements 206, 208, 210, 212). Continuous query management process 10 identifies the aggregating function (e.g., aggregating function 216). In this example, aggregating function 216 includes a minimum function for elements 204, 206, 208, 210 that identifies the minimum value among these elements.

In some implementations, continuous query management process 10 identifies 102 an accumulator associated with the aggregating function. An accumulator (e.g., accumulators 218, 220, 222) is a data structure, specific to each aggregation type to produce an aggregation result for an aggregating function. In one example, accumulator 218 is associated with the minimum aggregating function. In another example, accumulator 220 is associated with the maximum aggregating function. In another example, accumulator 222 is associated with the summation aggregating function. Accordingly, it will be appreciated that accumulators can be used for various aggregating functions.

In some implementations, continuous query management process 10 defines an accumulator for each aggregation function requested for the database of source elements. For example, continuous query management process 10 defines how an accumulator is initialized. In one example, an accumulator for an average aggregating function sets both a count value and a sum value to zero. In some implementations, continuous query management process 10 receives a selection of an aggregating function to generate an accumulator for. In some implementations, continuous query management process 10 identifies 102 an accumulator associated with the aggregating function by determining an aggregating function from a continuous query and identifying the respective aggregating function from the aggregating function of each accumulator. In this manner, continuous query management process 10 identifies 102 the accumulator associated with the aggregating function specified by the continuous query.

In some implementations, the accumulator is one of a single value accumulator and a lazy sorted set accumulator. For example, a single value accumulator is a data structure that stores a single key-value (i.e., a key defined as a hash of values and character offset of the function within the query and a value defined as the entire accumulator data structure serialized). In one example, suppose there are three source elements within database 214 of a first category (e.g., category "A"). In this example, a single value accumulator includes a key (e.g., "hash('A', 48)", where "48" is the character offset of the aggregating function in the query) and a value (e.g., "3").

In some implementations, a lazy sorted set accumulator is a data structure that supports aggregations (e.g., minimum, maximum, and other accumulating functions) with access to the distribution of values within the aggregated data. For aggregations such as minimum or maximum, each unique value and the number of times it occurs are tracked by the accumulator. This is to enable the ability to reliably remove values from the aggregation based on incremental changes. For example, suppose a minimum aggregating function is associated with accumulator 218. In this example, the values "3", "5", and "7" are added. The result of the minimum aggregating function is "3". If "5" is removed, the result (i.e., minimum value) is still "3". Then if "3" is removed, the result (i.e., minimum value) becomes "7". The lazy sorted set accumulator is a sorted map of unique values and the number of times each occurs. For example, consider the sequence of steps described in Table 1 and the effect each step has on the content of the accumulator:

TABLE 1

| Step | Action | Accumulator Content |
|---|---|---|
| 1 | Initial empty set | [empty] |
| 2 | Add 3 | [(3:1)] |
| 3 | Add 5 | [(3:1), (5:1)] |
| 4 | Add 2 | [(2:1), (3:1), (5:1)] |
| 5 | Add 3 | [(2:1), (3:2), (5:1)] |
| 6 | Remove 2 | [(3:2), (5:1)] |

Using a lazy sorted set accumulator, the current minimum value is retrieved by looking at the head item and values can be added/removed from the set without reading or writing the entire data structure, this enables the cardinality of each set to scale with minimal input/output (IO) impact (i.e., by limiting the reading and/or writing to particular entries within an accumulator).

In some implementations, continuous query management process 10 generates 104 a current aggregation result for the aggregating function of the continuous query without accessing every entry of the accumulator. For example and in some implementations, continuous query management process 10 enables a current aggregation result (i.e., a minimum value for a minimum aggregating function) to be generated 104 without accessing every entry of the accumulator. Returning to the above example of Table 1, suppose that accumulator 218 is a lazy sorted set accumulator with entries as shown in Table 1 that is associated with a minimum aggregating function at Step 4. In this example, continuous query management process 10 generates 104 a current aggregation result for the minimum aggregating function of continuous query 200 by reading the first entry of accumulator 218 (i.e., "2").

In some implementations, generating 104 the current aggregation result without accessing all entries of the accumulator includes generating 108 the current aggregation result without reading every entry of the accumulator. Continuing with the above example, now suppose that continuous query 200 is processed 100 after Step 6 in Table 1. In this example, continuous query management process 10 generates 108 a current aggregation result for the minimum aggregating function of continuous query 200 by reading the first entry of accumulator 218 (i.e., "3"). In this examples, continuous query management process 10 generates 108 a current aggregation result for the aggregating function of continuous query 200 without reading every entry of accumulator 218. In this manner, continuous query management process 10 limits the amount of input/output (IO) operations query management system 202 performs on an accumulator by generating the current aggregation result from a subset of the entries of the accumulator. In this example, continuous query management process 10 generates the current aggregation result using only the first entry, thereby generating 108 the current aggregation result (e.g., current aggregation result 224) without reading every entry of the accumulator.

In some implementations, generating 104 the current aggregation result without accessing all entries of the accumulator includes updating 110 the accumulator without writing every entry of the accumulator. For example and returning to the above example of Table 1, suppose that accumulator 218 is a lazy sorted set accumulator with entries as shown in Table 1 that is associated with a minimum aggregating function at Step 4. Continuous query management process 10 identifies an element within accumulator 218 associated with the update. In this example, continuous query management process 10 updates 110 accumulator 218 with a new value of "2" as the first element without writing or re-writing the entirety of accumulator 218. As shown in Table 1, an entry for the value "2" is added to accumulator 218. In this manner, continuous query management process 10 updates 110 accumulator 218 without writing or re-writing every entry of accumulator 218 by adding a new entry to accumulator 218.

In some implementations, generating 104 the current aggregation result without accessing all entries of the accumulator includes updating 112 an existing entry from the entries of the accumulator. For example and returning to the above example of Table 1, suppose that accumulator 218 is a lazy sorted set accumulator with entries as shown in Table 1 that is associated with a minimum aggregating function at Step 5. Continuous query management process 10 identifies an element within accumulator 218 associated with the update. In this example, continuous query management process 10 updates 112 accumulator 218 with an additional value of "3" in the second element without writing or re-writing the entirety of accumulator 218. As shown in Table 1, the number of values for "3" is incremented from one to two (i.e., "(3:1)" becomes "(3:2)"). In this manner, continuous query management process 10 updates 112 an existing entry (e.g., "(3:1)") from the entries of accumulator 218 without accessing every entry of accumulator 218.

In some implementations, generating 104 the current aggregation result without accessing all entries of the accumulator includes removing 114 an entry from the entries of the accumulator. For example and returning to the above example of Table 1, suppose that accumulator 218 is a lazy sorted set accumulator with entries as shown in Table 1 that is associated with a minimum aggregating function at Step 6. Continuous query management process 10 identifies an element within accumulator 218 associated with the update. In this example, continuous query management process 10 updates accumulator 218 by removing 114 an entry (e.g., "2") in the first element without writing or re-writing the entirety of accumulator 218. As shown in Table 1, the number of values for "2" is decremented from one to zero such that the entry for values of "2" is removed from accumulator 218. In this manner, continuous query management process 10 updates an existing entry (e.g., "(2:1)") by removing 114 the entry from accumulator 218 without accessing every entry of accumulator 218.

In some implementations, continuous query management process 10 generates 106 a continuous query result for the continuous query using the accumulator associated with the aggregating function. A continuous query result is the result of the aggregating function of the continuous query as generated 106 using the accumulator. Referring again to the example of Table 1 described above, suppose continuous query management process 10 processes 100 a continuous query (e.g., continuous query 200) at Step 6. In this example, continuous query management process 10 generates 106 a continuous query result (e.g., continuous query result 226) by processing current aggregation result 224 with query management system 202. For instance, query management system 202 applies any additional query logic (i.e., query logic beyond the aggregation function) to generate 106 continuous query result 226. In the above example, continuous query management process 10 generates continuous query result 226 of "3" as the minimum value. In some implementations, continuous query management process 10 provides continuous query result 226 to the requesting computing device (e.g., computing device 204) for subsequent processing.

In some implementations, continuous query management process 10 persists 116 the accumulator to a storage device.

For example, conventional query management processes resolve aggregation function(s) in memory (i.e., random access memory). As such, these results are generally not persisted because regular queries do not have ongoing temporal considerations but provide a "snapshot" of the aggregation function at the time a regular query is processed. By contrast, continuous query management process 10 generates accumulator(s) for each aggregation function and persists 116 these accumulators to a storage device (e.g., a disk or other persistent memory device) for subsequent access by query management system 202. Persisting 116 the accumulator to a storage device includes storing the accumulator within a storage device. For example, the accumulator is persisted to a storage device, so that that the accumulator can run in perpetuity and/or can be moved across computing resources without being destroyed, since the accumulator may exist longer than the compute resources running it. Persisting 116 the accumulator to a storage device also enables it to scale beyond the limits of random access memory (RAM), as only parts of the accumulator will be executed in RAM at one time. Referring again to the example of FIG. 2, continuous query management process 10 persists 116 accumulators 218, 220, 222 to a storage device (e.g., storage device 228) that is accessible to continuous query management process 10. In some implementations, continuous query management process 10 manages the accumulators in storage device 228 by adding, modifying, and/or removing accumulators from storage device 228. For example, continuous query management process 10 manages the amount of storage space available for accumulators and evicts least accessed accumulators as needed to create storage capacity for new accumulators.

Figure 3:
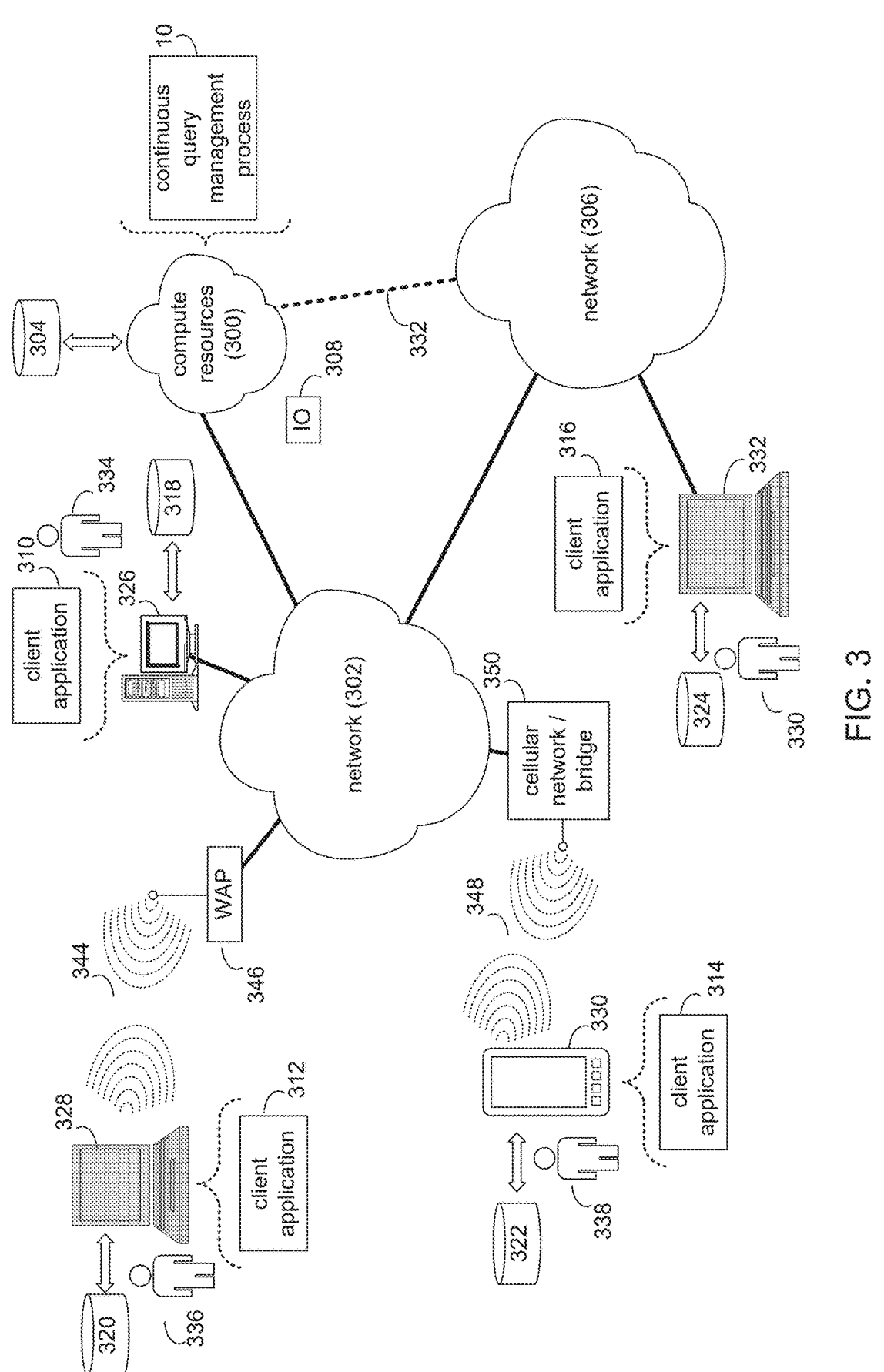
FIG. 3 is a diagrammatic view of computer system and a continuous query management process coupled to a distributed computing network.

System Overview:

Referring to FIG. 3, a continuous query management process 10 is shown to reside on and is executed by compute resources 300, which is connected to network 302 (e.g., the Internet or a local area network). Examples of compute resources 300 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of compute resources 300 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of continuous query management process 10, which are stored on storage device 304 included within compute resources 300, are executed by one or more processors (not shown) and one or more memory architectures (not shown) included within compute resources 300. Storage device 304 may include: a hard disk drive; an optical drive; a RAID device; a random-access memory (RAM); a read-only memory (ROM); and all forms of flash memory storage devices. Additionally or alternatively, some portions of the instruction sets and subroutines of continuous query management process 10 are stored on storage devices (and/or executed by processors and memory architectures) that are external to compute resources 300.

In some implementations, network 302 is connected to one or more secondary networks (e.g., network 306), examples of which include: a local area network; a wide area network; or an intranet.

Various input/output (IO) requests (e.g., IO request 308) are sent from client applications 310, 312, 314, 316 to compute resources 300. Examples of IO request 308 include data write requests (e.g., a request that content be written to compute resources 300) and data read requests (e.g., a request that content be read from compute resources 300).

The instruction sets and subroutines of client applications 310, 312, 314, 316, which may be stored on storage devices 318, 320, 322, 324 (respectively) coupled to client electronic devices 326, 328, 330, 332 (respectively), may be executed by one or more processors (not shown) and one or more memory architectures (not shown) incorporated into client electronic devices 326, 328, 330, 332 (respectively). Storage devices 318, 320, 322, 324 may include: hard disk drives; tape drives; optical drives; RAID devices; random access memories (RAM); read-only memories (ROM), and all forms of flash memory storage devices. Examples of client electronic devices 326, 328, 330, 332 include personal computer 326, laptop computer 328, smartphone 330, laptop computer 332, a server (not shown), a data-enabled, and a dedicated network device (not shown). Client electronic devices 326, 328, 330, 332 each execute an operating system.

Users 334, 336, 338, 330 may access compute resources 300 directly through network 302 or through secondary network 306. Further, compute resources 300 may be connected to network 302 through secondary network 306, as illustrated with link line 332.

The various client electronic devices may be directly or indirectly coupled to network 302 (or network 306). For example, personal computer 326 is shown directly coupled to network 302 via a hardwired network connection. Further, laptop computer 332 is shown directly coupled to network 306 via a hardwired network connection. Laptop computer 328 is shown wirelessly coupled to network 302 via wireless communication channel 344 established between laptop computer 328 and wireless access point (e.g., WAP) 346, which is shown directly coupled to network 302. WAP 346 may be, for example, an IEEE 802.11a, 802.11b, 802.11g, 802.11n, Wi-Fi®, and/or Bluetooth® device that is capable of establishing a wireless communication channel 344 between laptop computer 328 and WAP 346. Smartphone 330 is shown wirelessly coupled to network 302 via wireless communication channel 348 established between smartphone 330 and cellular network/bridge 350, which is shown directly coupled to network 302.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A method, comprising:
processing a continuous query directed to a database, the continuous query comprising an aggregating function to be applied over a set of elements of the database;
identifying an accumulator, associated with the aggregating function, that stores one or more values from the set of elements of the database identified by the aggregating function;
determining an aggregation result for the aggregating function based on a subset of the one or more values from the set of elements of the database stored in the accumulator;
storing, in the accumulator, the aggregation result of the aggregating function of the continuous query; and
generating a continuous query result for the continuous query based on the aggregation result stored in the accumulator associated with the aggregating function.

2. The method of claim 1, further comprising:
persisting the accumulator to a storage device.

3. The method of claim 1, wherein the accumulator is one of a single value accumulator and a lazy sorted set accumulator.

4. The method of claim 1, wherein generating the aggregation result comprises generating the aggregation result without reading every entry of the accumulator.

5. The method of claim 1, wherein generating the aggregation result comprises updating the accumulator without writing every entry of the accumulator.

6. The method of claim 1, wherein generating the aggregation result comprises updating an existing entry from the entries of the accumulator.

7. The method of claim 1, wherein generating the aggregation result comprises removing an entry from the entries of the accumulator.

8. A computing system comprising:
a memory; and
a processor operatively coupled to the memory, the processor configured to;
process a continuous query directed to a database, the continuous query comprising an aggregating function to be applied over a set of elements of the database,
identify an accumulator, associated with the aggregating function, that stores one or more values from the set of elements of the database identified by the aggregating function,
determine an aggregation result for the aggregating function based on a subset of the one or more values from the set of elements of the database stored in the accumulator,
store, in the accumulator, the aggregation result of the aggregating function of the continuous query,
generate a continuous query result for the continuous query based on the aggregation result stored in the accumulator associated with the aggregating function, and
persist the accumulator to a storage device.

9. The computing system of claim 8, wherein the accumulator is a single value accumulator.

10. The computing system of claim 8, wherein the accumulator is a lazy sorted set accumulator.

11. The computing system of claim 8, wherein to generate the aggregation result the processor is configured to generate the aggregation result without reading every entry of the accumulator.

12. The computing system of claim 8, wherein to generate the aggregation result the processor is configured to update accumulator without writing every entry of the accumulator.

13. The computing system of claim 8, wherein to generate the aggregation result the processor is configured to update an existing entry from the entries of the accumulator.

14. The computing system of claim 8, wherein to generate the aggregation result the processor is configured to remove an entry from the entries of the accumulator.

15. A non-transitory computer readable storage medium having instructions stored thereon which, when executed by a processor, cause the processor to:

process a continuous query directed to a database, the continuous query comprising an aggregating function to be applied over a set of elements of the database;

identify an accumulator, associated with the aggregating function, that stores one or more values from the set of elements of the database identified by the aggregating function;

determine an aggregation result for the aggregating function based on a subset of the one or more values from the set of elements of the database stored in the accumulator, store, in the accumulator, the aggregation result of the aggregating function of the continuous query; and generate a continuous query result for the continuous query based on the aggregation result stored in the accumulator associated with the aggregating function.

16. The non-transitory computer readable storage medium of claim 15, wherein the processor is further to:

persist the accumulator to a storage device.

17. The non-transitory computer readable storage medium of claim 15, wherein to generate the aggregation result the processor is to generate the aggregation result without reading every entry of the accumulator.

18. The non-transitory computer readable storage medium of claim 15, wherein to generate the aggregation result the processor is to update the accumulator without writing every entry of the accumulator.

19. The non-transitory computer readable storage medium of claim 15, wherein to generate the aggregation result the processor is to update an existing entry from the entries of the accumulator.

20. The non-transitory computer readable storage medium of claim 15, wherein to generate the aggregation result the processor is to remove an entry from the entries of the accumulator.

* * * * *